(12) United States Patent
Coppinger et al.

(10) Patent No.: US 8,850,330 B2
(45) Date of Patent: Sep. 30, 2014

(54) EDITING REPEATING CALENDAR EVENTS

(75) Inventors: Jodi L. Coppinger, Merrimack, NH (US); David P. Delay, Milford, NH (US); Brian J. Levine, Chelmsford, MA (US); Frank A. Pavelski, Bolton, MA (US)

(73) Assignee: International Business Machines Corporation, Armonk, NY (US)

( * ) Notice: Subject to any disclaimer, the term of this patent is extended or adjusted under 35 U.S.C. 154(b) by 788 days.

(21) Appl. No.: 11/189,192

(22) Filed: Jul. 26, 2005

(65) Prior Publication Data
US 2006/0020889 A1    Jan. 26, 2006

Related U.S. Application Data

(60) Provisional application No. 60/591,020, filed on Jul. 26, 2004.

(51) Int. Cl.
*G06F 3/00*           (2006.01)
*G06Q 10/10*       (2012.01)

(52) U.S. Cl.
CPC ........... *G06Q 10/109* (2013.01); *Y10S 715/963* (2013.01)
USPC ............................ 715/751; 715/708; 715/963

(58) Field of Classification Search
CPC . G06Q 10/109; G06Q 10/10; G06Q 10/1095; G06Q 10/06311; G06Q 9/542
USPC ................. 715/710, 963, 751, 764, 821, 828; 705/7.18–7.21
See application file for complete search history.

(56) References Cited

U.S. PATENT DOCUMENTS

| | | | |
|---|---|---|---|
| 6,370,566 B2 * | 4/2002 | Discolo et al. | 709/206 |
| 6,769,120 B1 * | 7/2004 | Rodriguez | 718/100 |
| 7,370,282 B2 * | 5/2008 | Cary | 715/772 |
| 2003/0204474 A1 * | 10/2003 | Capek et al. | 705/64 |
| 2004/0078436 A1 * | 4/2004 | Demsky et al. | 709/206 |
| 2004/0243547 A1 * | 12/2004 | Chhatrapati et al. | 707/2 |
| 2005/0114777 A1 * | 5/2005 | Szeto | 715/710 |
| 2005/0192857 A1 * | 9/2005 | Levine | 705/8 |
| 2006/0010023 A1 * | 1/2006 | Tromczynski et al. | 705/8 |

OTHER PUBLICATIONS

Syroid et al., "Outlook 2000 in a Nutshell", published by O'Reilly & Associates, copyright 2000 O'Reilly & Associates, Inc., pertinent Chapter 7, available from Safari Books Online: http://proquest.safaribooksonline.com/1565927044.*
Screenshots of Microsoft Outlook 2000 SP-3, copyright 1999 Microsoft Corp., Service Pack 3 (SP3) released Oct. 21, 2002.*

* cited by examiner

*Primary Examiner* — Omar Abdul-Ali
*Assistant Examiner* — Andrew Tank
(74) *Attorney, Agent, or Firm* — Steven M. Greenberg, Esq.; CRGO Law

(57) ABSTRACT

Embodiments of the present invention provide a novel and non-obvious method, system and computer program product for editing an event in a C&S system. In one embodiment, a method for editing an event in a C&S system can include specifying a recurrence range before permitting editing of the event. The method further can include disposing an in-line disambiguating message in a calendar dialog for the C&S system indicating whether an event instance or whether all instances of the event are to be edited in the calendar dialog. The method yet further can include limiting actions in a user interface in response to limiting a core engine for the C&S system. Specifically, limiting actions in a user interface in response to limiting a core engine for the C&S system can include permitting only an editing of a single instance for the event in response to an attendee exception.

14 Claims, 3 Drawing Sheets

EDITING REPEATING CALENDAR EVENTS

CROSS-REFERENCE TO RELATED APPLICATIONS

This patent application claims the benefit under 35 U.S.C. §119(e) of presently pending U.S. Provisional Patent Application 60/591,020, entitled EDITING REPEATING CALENDAR EVENTS, filed on Jul. 26, 2004, the entire teachings of which are incorporated herein by reference.

BACKGROUND OF THE INVENTION

1. Field of the Invention

The present invention relates to calendar management in a calendaring application and more particularly to handling repeating calendar events in a calendaring application.

2. Description of the Related Art

Calendaring systems have formed the core component of personal information management software and firmware applications for decades. Initially, a mere calendar display, modern calendaring systems provide scheduling and alarm functions in addition to full integration with contact management, time entry, billing and project management applications. The typical calendaring application minimally provides a mechanism for scheduling an event to occur on a certain date at a certain time. Generally, the event can be associated with a textual description of the event. More advanced implementations also permit the association of the scheduled event with a particular contact, a particular project, or both. Furthermore, most calendar applications provide functionality for setting an alarm prior to the occurrence of the event, as well as archival features.

Several software products include support for Calendaring & Scheduling (C&S). Known C&S products include Lotus Notes, Microsoft Outlook, and web-based products like Yahoo! Calendar. These products allow one to manage personal events including appointments and anniversaries. C&S products also typically allow one to manage shared events, referred to generally as meetings. Notably, many C&S products include the concept of repeating events. The creation of repeating events is generally straightforward. The user interface permits one to define the first instance of the repeating series and to specify how the series repeats. For example, an event might repeat weekly for five weeks or it might repeat monthly until Dec. 31, 2005. The definition of a repeating series often is referred to as a "recurrence rule".

More specifically, an important feature of a calendaring system includes the ability to schedule a recurring event without requiring the end user to individually set an event on each recurring date. For example, where a meeting is to occur every week on a particular time over the course of several months, the end user can schedule the event as recurring every week at the particular time for the course of the several months. The calendaring system, in turn, can schedule each event in an automated fashion based upon the recurring information. Advantageously, the end user subsequently can modify any one of the recurring events, or the end user can apply a single modification to all of the recurring events responsive to which the calendaring system can apply the single modification to all of the recurring events in an automated fashion.

In recent years, computing has changed from a centralized model to a distributed model. Vast computer communications networks now connect select users across the enterprise. Leveraging the wide reach of the modern enterprise, calendaring systems can incorporate multiple users and the events scheduled by multiple users. In particular, "groupware" oriented calendaring systems can permit one user to view and schedule events of other, remotely positioned users. To further provide interoperability between different types of calendaring systems, entire specifications have been developed to accommodate the distributed and disparate nature of the calendaring world. RFC2445 entitled "The Internet Calendaring and Scheduling Core Object Specification (iCalendar)" represents one such effort.

Notably, distributed and interoperable calendaring systems, like their stand-alone progeny, support the establishment of recurring events without requiring the end user to set each individual recurring event manually. Yet, more recent calendaring implementations no longer simply automate the process of setting multiple events specified by as recurring in nature. Rather, to conserve storage space, recurring events can be stored as a single event described as recurring in nature. More particularly, in order to optimize for space, the storage model employed by advanced calendaring systems stores only the event data and the recurrence rule. The actual event instances can be calculated dynamically when a request is processed to retrieve events within a certain date range.

The user interface for editing repeating events typically is not straightforward in nature. Some C&S products allow one to select a repeating instance, place the repeating instance in edit mode, and apply changes to the repeating instance. A noted problem is that the user interface does not allow one to adequately express intent in editing a repeating instance. Examples include:

a) Are all instances of a repeating series to be edited, a subset of the instances, or just the selected instance?

b) When editing more than one instance, should each field for each instance be changed or should only selected fields be changed?

c) When changing the date or time of an event and saving changes to all instances, is it the intent to recreate the recurrence rule thereby undoing previous changes to single instances?

d) When editing events associated with workflows, how are participants to be notified of changes?

Importantly, a modification to a recurring event can be applied universally, to single instances of the recurring event, to past instances of a recurring event, or to all future recurring events. As described in RFC2445, however, the modification of the recurring event can be applied internally to the recurring event. Specifically, the recurrence rule defined within the recurring event, itself, can include the modifications to the recurrence rule. Interpreting and applying a modification to a recurrence rule in the conventional model, however, can be difficult and problematic for the uninitiated. Accordingly, it would be preferable to incorporate a simplified system, method and apparatus for applying modifications to recurring events in a calendaring system.

BRIEF SUMMARY OF THE INVENTION

Embodiments of the present invention address deficiencies of the art in respect to recurring events in a C&S system and provide a novel and non-obvious method, system and computer program product for editing an event in a C&S system. In one embodiment, a method for acting upon an event in a C&S system can include specifying a recurrence range before permitting adding, removing or changing invitees to the event. The method further can include disposing an in-line disambiguating message in a calendar dialog for the C&S system indicating whether an event instance or whether all instances of the event are to be edited in the calendar dialog.

The method yet further can include limiting actions in a user interface in response to limitations in a core engine for the C&S system. Specifically, limiting actions in a user interface in response to limitations in a core engine for the C&S system can include permitting only an editing of a single instance for the event in response to an attendee exception.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for eliminating ambiguities from a calendaring system user interface for modifying recurring instances scheduled in the calendaring system. In a traditional C&S user interface, a user can select an instance of a repeating series in the user's calendar and subsequent to which the user can take an action. Actions include View, Edit, and Delete, for example. A meeting might include additional actions, such as Change Invitees. In accordance with the present invention, for each action it can be important to establish as soon as possible a recurrence range upon which the user is to act.

Accordingly, a user interface for a C&S system can be arranged to: (1) Ask the user to specify a recurrence range prior to editing a recurring event; (2) Use in-line messages to explain complex behaviors; (3) Limit the user interface where the core C&S engine is limited; (4) For meetings, provide a separate action for changing invitees; and (5) For meetings, leave a "paper trail" of outbound workflow notices. The combination of the foregoing elements ensures the user never is left in doubt about the effect of changes the user applies to repeating events.

Figure 1:
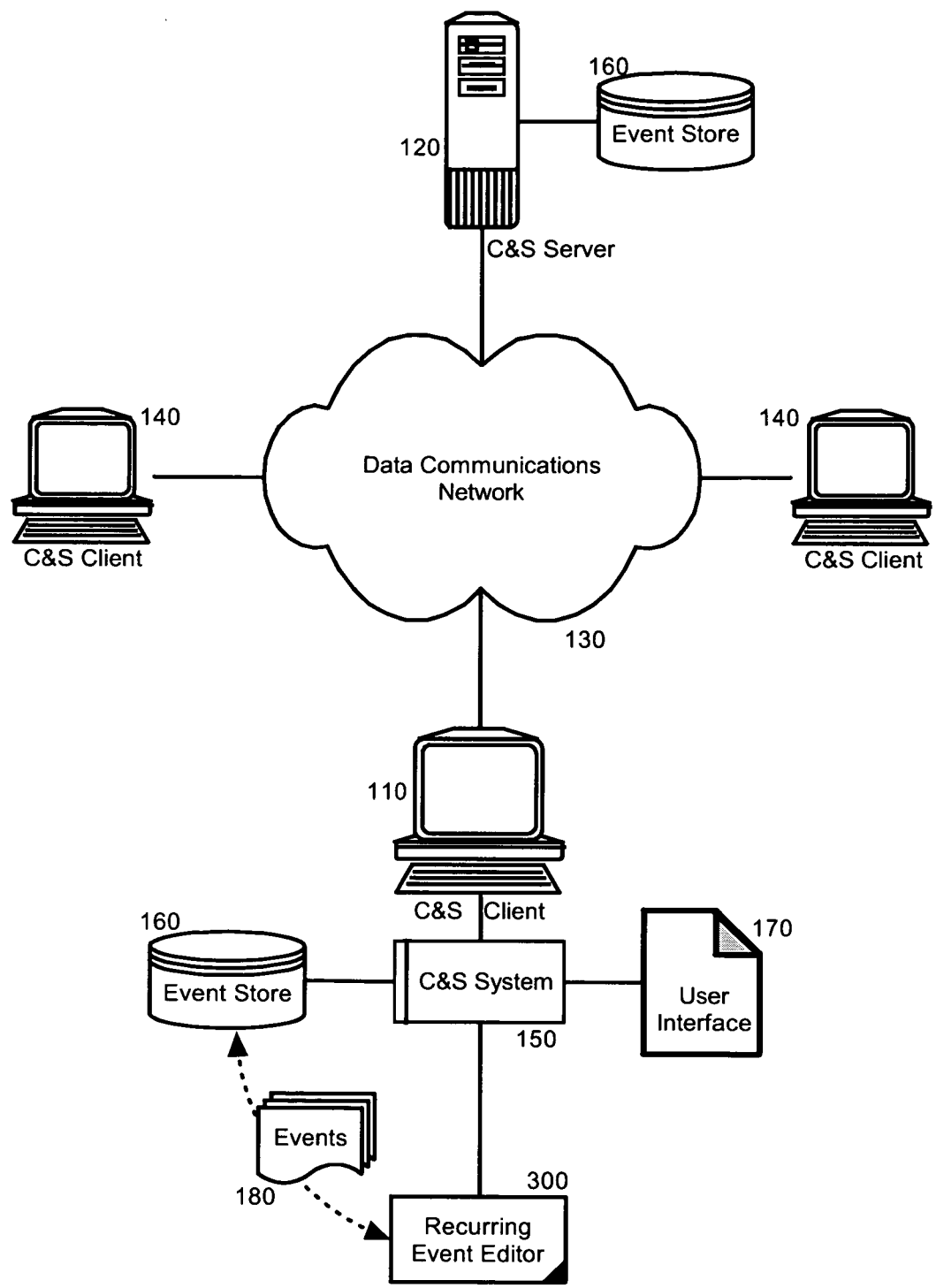
FIG. 1 is a schematic illustration of a C&S system configured to act upon repeating calendar events.

In more particular illustration, FIG. 1 is a schematic illustration of a C&S system configured to acting upon repeating calendar events. The C&S system can include a C&S client 110 configured with C&S application logic 150. The C&S application logic 150 can include both a user interface 170 through which an end user can interact with the C&S application logic 150 and also an event store 160 in which events can be stored for the C&S application logic 150. Optionally, the C&S system can be a multi-user, distributed system. In the latter circumstance, the C&S client 110 can be communicatively coupled to a C&S server 120 (which can host the C&S application logic 150) over a computer communications network 130, and multiple other C&S clients 140 can be communicatively linked to the C&S server 120 over the computer communications network 130. In the latter circumstance, the event store 160 can be coupled to the C&S server 120.

Figure 2A:
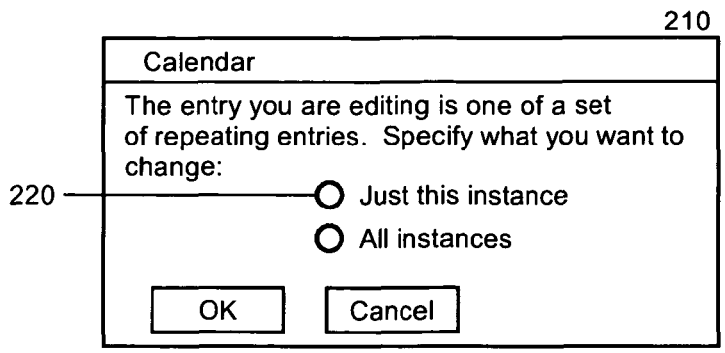
FIG. 2A is a pictorial illustration of a dialog box in a user interface for acting upon a repeating entry in the system of FIG. 1.

Notably, a recurring event editor 300 can be coupled to the C&S system 150 and can be configured to process events 180 in the event store 160. In operation, when editing a repeating entry in the C&S application logic 150 through the recurring event editor 300, an editing user can be presented with a prompt. The prompt can provide a user an opportunity to specify the recurrence range before permitting the editing of the event. By establishing the recurrence range first, a user interface can provide more specific guidance with in-line messages. FIG. 2A is a pictorial illustration of a calendar dialog 210 in which the user can indicate the recurrence range 220.

Figure 2B:
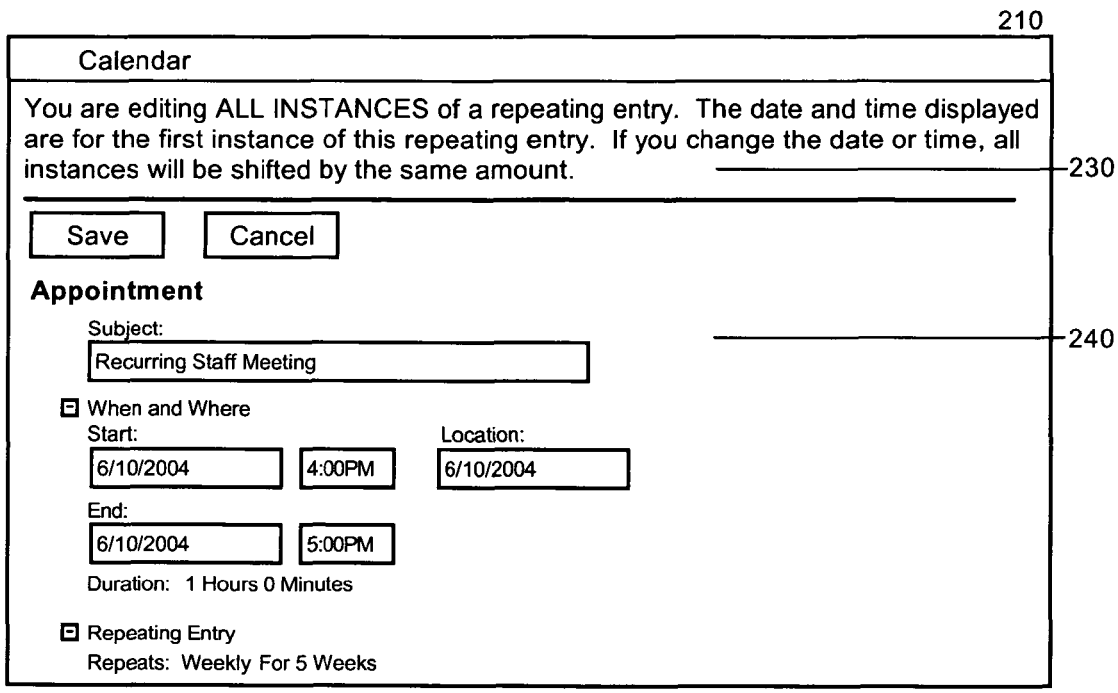
FIG. 2B is a pictorial illustration of a dialog box in a user interface for acting upon all instances of a repeating entry in the system of FIG. 1.

In another aspect of the invention, in-line messages can be used to resolve such ambiguities. For example, as shown in FIG. 2B, when a user acts upon all instances of a repeating appointment, a disambiguation message can be displayed at the top of the event edit page 210. As it will be apparent from the illustration of FIG. 2B, the disambiguation message (1) Reminds the user that the user is editing all instances; (2) Reminds the user that the date and time are for the first instance—regardless of which instance the user selected to start editing; and, (3) Describes what will happen when the user changes the date or time. In the illustrated example, the dates for all instances are shifted by the same amount of a change to any instance of the event and the recurrence rule is not recreated. As such, the disambiguation message 260 eliminates the guess work of what will happen when the user elects to save the edited appointment.

Figure 2C:
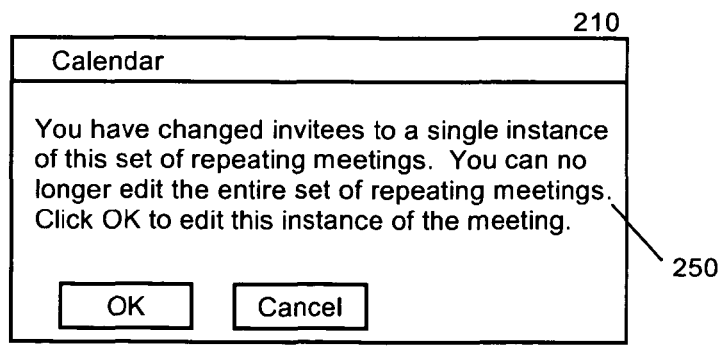
FIG. 2C is a pictorial illustration of a message box referring to the changing of invitees to a single instance of a set of repeating meetings in the system of FIG. 1; and, FIG. 3 is a flow chart illustrating a process for acting upon repeating calendar events in the system of FIG. 1.

In accordance with the present invention, the user interface can be limited where the core C&S engine is limited. Specifically, in an aspect of the invention, the core C&S engine has the concept of an "attendee exception". An attendee exception is the result of changing the invitees for a single instance of a repeating meeting. Consequently, as shown in FIG. 2C, the user can be limited to editing a single instance of a set of repeating meetings when a repeating meeting includes an attendee exception. The user can be so notified through the dialog box 210 with the warning text 250.

The foregoing limitation can be imposed because of the complexity of producing multiple notices for different sets of attendees. By "roping off" the ability to edit all instances of the repeating meeting, the user can be protected from making changes the user cannot save. Other C&S user interfaces lead the user down the dead-end of editing the meeting, but then prevent the user from saving changes to all instances. Or worse, some user interfaces allow the user save changes to all instances despite the engine's limitation, thereby causing the organizer and attendees calendars to be out of synch.

As an additional aspect of the present invention, for meetings scheduled in the C&S system, the user interface can provide a separate action for changing invitees. Specifically, some C&S user interfaces treat the invitee list as just another property of an event. The user can place the event in edit mode and change invitees in addition to the location, description and other properties. As mentioned when discussing the deficiencies of the prior art, this has consequences for the resulting workflow notices.

Finally, in accordance with another aspect of the invention, for meetings, a "paper trail" is to be formulated for outbound workflow notices. In particular, after making multiple edits to a repeating meeting and perhaps changing invitees on one or more instances, the organizer's calendar contains the current "snapshot" of the meeting. Occasionally, the organizer wonders how an instance got in its current state. For example, why was Bob invited to instance C, but not instance A? Or why is there a different location for instance B? To solve this problem, in a preferred aspect of the invention, a copy of all outbound notices can be saved in the Sent folder. This provides a "paper trail" of all changes for each meeting. The organizer can consult this paper trail to "replay" the changes he has made.

Figure 3:
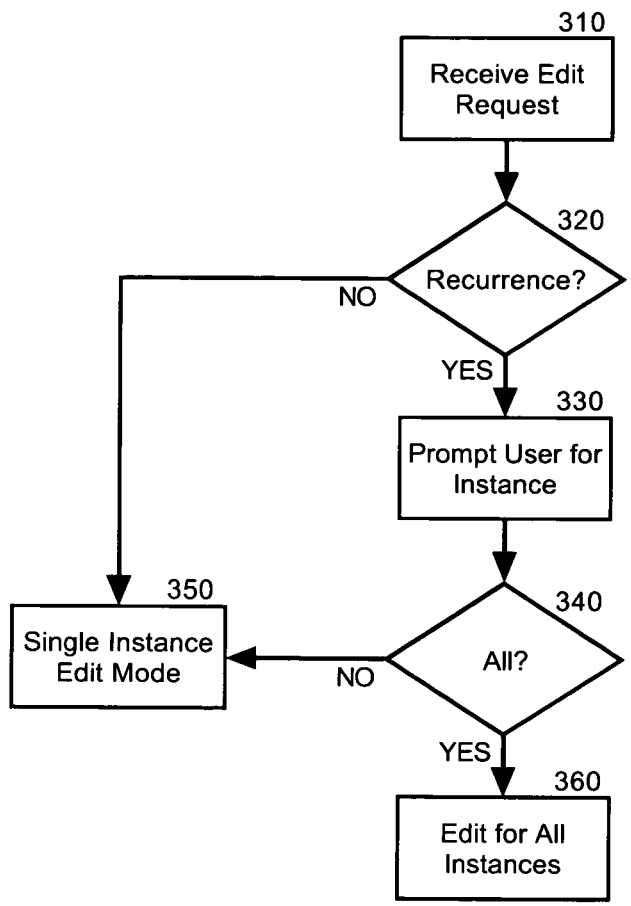

Turning now to FIG. 3, a flow chart is shown which illustrates a process for acting upon repeating calendar events in the system of FIG. 1. Beginning in block 310, an edit request can be received for an event. In decision block 320, it can be determined if the event is a recurring event. If not, the event can be edited as a single instance in block 350. Otherwise, in block 330, the user can be prompted for whether the event is to be edited as a single instance or as a recurring event. If the event is to be edited as a single instance, the event can be edited as a single instance in block 350. Otherwise, the event can be edited as a recurring event in block 360.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for acting upon an event in a calendaring and scheduling (C&S) system comprising:
   coupling a recurring event editor to a C&S system;
   selecting in the recurring event editor, an instance of a repeating event in an event store of the C&S system;
   displaying the selected instance in the event editor;
   prompting in an in-line disambiguating message in the event editor whether the selected instance of the repeating event, or whether all instances of the repeating event are to be edited;
   further warning in an in-line disambiguating message in the event editor in response to editing only the selected instance of the repeating event that subsequent attempts to edit all instances of the repeating event will be prohibited; and,
   prohibiting subsequent to the editing of only the selected instance of the repeating event an attempt to edit all instances of the repeating event.

2. The method of claim 1, wherein said in-line disambiguating message further indicates a date and time for a first instance of a recurring event regardless of which event instance for said recurring event is selected for editing.

3. The method of claim 1, wherein said in-line disambiguating message further indicates a result of changing a date or a time for the event.

4. The method of claim 1, further comprising limiting actions in a user interface in response to limiting a core engine for the C&S system.

5. The method of claim 4, wherein said limiting actions in a user interface in response to limiting a core engine for the C&S system, comprises permitting only an editing of a single instance for the event in response to an attendee exception.

6. The method of claim 1, further comprising providing separate actions for changing invitees to the event and editing the event.

7. The method of claim 1, further comprising saving a copy of all outbound notices for the event in a folder in order to provide a paper trail for outbound workflow notices for the event.

8. A non-transitory computer program product comprising a computer usable storage medium storing computer usable program code for acting upon an event in a calendaring and scheduling (C&S) system, said computer program product comprising a memory device including computer usable program code for:
   coupling a recurring event editor to a C&S system;
   selecting in the recurring event editor, an instance of a repeating event in an event store of the C&S system,
   displaying the selected instance in the event editor,
   prompting in an in-line disambiguating message in the event editor whether the selected instance of the repeating event, or whether all instances of the repeating event are to be edited;
   further warning in an in-line disambiguating message in the event editor in response to editing only the selected instance of the repeating event that subsequent attempts to edit all instances of the repeating event will be prohibited; and,
   prohibiting subsequent to the editing of only the selected instance of the repeating event an attempt to edit all instances of the repeating event.

9. The computer program product of claim 8, wherein said in-line disambiguating message further indicates a date and time for a first instance of a recurring event regardless of which event instance for said recurring event is selected for editing.

10. The computer program product of claim 8, wherein said in-line disambiguating message further indicates a result of changing a date or a time for the event.

11. The computer program product of claim 8, further comprising computer usable program code for limiting actions in a user interface in response to limiting a core engine for the C&S system.

12. The computer program product of claim 11, wherein said computer usable program code for limiting actions in a user interface in response to limiting a core engine for the C&S system, comprises computer usable program code for permitting only an editing of a single instance for the event in response to an attendee exception.

13. The computer program product of claim 8, further comprising computer usable program code for providing separate actions for changing invitees to the event and editing the event.

14. The computer program product of claim 8, further comprising computer usable program code for saving a copy of all outbound notices for the event in a folder in order to provide a paper trail for outbound workflow notices for the event.

* * * * *